US009542668B2

(12) United States Patent
Gilad et al.

(10) Patent No.: US 9,542,668 B2
(45) Date of Patent: Jan. 10, 2017

(54) SYSTEMS AND METHODS FOR CLUSTERING ELECTRONIC MESSAGES

(71) Applicant: Google Inc., Mountain View, CA (US)

(72) Inventors: Itamar Gilad, Zurich (CH); Thompson Alexander Ivor Gawley, Palo Alto, CA (US); Andrew Ward Moedinger, Canton of Zurich (CH); Deepak Jindal, Sunnyvale, CA (US); Kevin Smilak, Adliswil (CH); Jeroen Daniël Jillissen, Wadenswil (CH); Balint Miklos, Zurich (CH); Jason Briggs Cornwell, Menlo Park, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/186,823

(22) Filed: Feb. 21, 2014

(65) Prior Publication Data
US 2015/0185973 A1 Jul. 2, 2015

Related U.S. Application Data

(60) Provisional application No. 61/922,027, filed on Dec. 30, 2013.

(51) Int. Cl.
G06F 3/048 (2013.01)
G06Q 10/10 (2012.01)

(52) U.S. Cl.
CPC .................... G06Q 10/107 (2013.01)

(58) Field of Classification Search
USPC ........................................................ 715/752
See application file for complete search history.

(56) References Cited

U.S. PATENT DOCUMENTS

| 4,914,650 | A | 4/1990 | Sriram |
| 5,948,040 | A | 9/1999 | DeLorme et al. |
| 5,948,058 | A | 9/1999 | Kudoh et al. |
| 6,044,260 | A | 3/2000 | Eaton et al. |
| 6,057,841 | A | 5/2000 | Thurlow et al. |
| 6,147,977 | A | 11/2000 | Thro et al. |
| 6,232,972 | B1 | 5/2001 | Arcuri et al. |

(Continued)

OTHER PUBLICATIONS

Cohen, Learning Rules that classify E-mail, Feb. 22, 2002, 8 pgs.

Primary Examiner — Jeffrey A Gaffin
Assistant Examiner — Justin Lee
(74) Attorney, Agent, or Firm — Morgan, Lewis & Bockius LLP

(57) ABSTRACT

System and methods are provided for receiving selection, by a user, of a subset of message clusters in a plurality of message clusters. Each message cluster is associated with a corresponding set of clustering rules. Each respective electronic message, addressed to and/or from the user, in a plurality of electronic messages is assigned to one or more of the clusters in the subset of clusters in accordance with the sets of clustering rules associated with the subset of clusters. The set of clustering rules for a first cluster in the subset of clusters (i) prevents some messages in the plurality of messages from being assigned to the first cluster and (ii) assigns messages to the first cluster without regard to content relatedness between messages in the plurality of messages and messages already in the first cluster. Messages in the first cluster are formatted for display as a single cluster graphic.

14 Claims, 10 Drawing Sheets

(56) References Cited

U.S. PATENT DOCUMENTS

| | | |
|---|---|---|
| 6,252,597 B1 | 6/2001 | Lokuge |
| 6,333,973 B1 | 12/2001 | Smith et al. |
| 6,351,764 B1 | 2/2002 | Voticky et al. |
| 6,421,709 B1 | 7/2002 | McCormick et al. |
| 6,507,866 B1 | 1/2003 | Barchi |
| 6,700,591 B1 | 3/2004 | Sharpe |
| 6,704,772 B1 | 3/2004 | Ahmed et al. |
| 6,725,228 B1 | 4/2004 | Clark et al. |
| 6,778,642 B1 | 8/2004 | Schmidt, Jr. et al. |
| 6,961,341 B1 | 11/2005 | Krishnan |
| 7,120,865 B1 | 10/2006 | Horvitz et al. |
| 7,167,910 B2 | 1/2007 | Farnham et al. |
| 7,194,516 B2 | 3/2007 | Giacobbe et al. |
| 7,359,947 B2 | 4/2008 | Kelley et al. |
| 7,386,535 B1 | 6/2008 | Kalucha et al. |
| 7,415,504 B2 | 8/2008 | Schiavone et al. |
| 7,421,690 B2 | 9/2008 | Forstall et al. |
| 7,429,993 B2 | 9/2008 | Hui |
| 7,475,120 B1 | 1/2009 | Ngo et al. |
| 7,506,263 B1 | 3/2009 | Johnston et al. |
| 7,536,652 B2 | 5/2009 | Uemura et al. |
| 7,539,732 B2 | 5/2009 | Kelso et al. |
| 7,568,011 B2 | 7/2009 | Bocking et al. |
| 7,689,656 B2 | 3/2010 | McCarthy et al. |
| 7,730,137 B1 | 6/2010 | Toomey |
| 7,765,212 B2 | 7/2010 | Surendran et al. |
| 7,788,329 B2 | 8/2010 | Barrett et al. |
| 7,814,155 B2 | 10/2010 | Buchheit et al. |
| 7,895,279 B2 | 2/2011 | Forstall et al. |
| 7,895,537 B2 | 2/2011 | Gruen et al. |
| 7,958,099 B2 | 6/2011 | Kang et al. |
| 7,979,501 B1 | 7/2011 | Coleman et al. |
| 7,996,900 B2 | 8/2011 | Gillum et al. |
| 8,010,613 B2 | 8/2011 | Oral et al. |
| 8,031,845 B2 | 10/2011 | Gruen et al. |
| 8,041,745 B2 | 10/2011 | Newton et al. |
| 8,065,369 B2 | 11/2011 | Turski et al. |
| 8,095,400 B2 | 1/2012 | Herde et al. |
| 8,108,469 B2 | 1/2012 | Kent, Jr. et al. |
| 8,140,703 B2 | 3/2012 | Morris et al. |
| 8,150,926 B2 | 4/2012 | Sundararajan et al. |
| 8,150,930 B2 | 4/2012 | Satterfield et al. |
| 8,176,130 B2 | 5/2012 | Daniell |
| 8,224,902 B1 | 7/2012 | Glasser et al. |
| 8,230,350 B2 | 7/2012 | Dodsworth |
| 8,233,885 B2 | 7/2012 | Kansal et al. |
| 8,239,874 B2 | 8/2012 | Anderson et al. |
| 8,281,382 B1 | 10/2012 | Sanyal et al. |
| 8,286,089 B2 | 10/2012 | Hardy et al. |
| 8,307,029 B2 | 11/2012 | Davis et al. |
| 8,375,307 B2 | 2/2013 | Kim |
| 8,375,400 B2 | 2/2013 | Sutedja et al. |
| 8,402,096 B2 | 3/2013 | Affronti et al. |
| 8,448,084 B2 | 5/2013 | Brichter |
| 8,499,042 B2 | 7/2013 | Brown et al. |
| 8,499,048 B2 | 7/2013 | Malik et al. |
| 8,533,274 B2 | 9/2013 | Buchheit et al. |
| 8,560,619 B1 | 10/2013 | Huston et al. |
| 8,572,277 B2 | 10/2013 | Morris et al. |
| 8,577,967 B1 | 11/2013 | Chavez et al. |
| 8,583,747 B2 | 11/2013 | Buchheit et al. |
| 8,626,851 B2 | 1/2014 | Buchheit et al. |
| 8,656,289 B1 | 2/2014 | Dodsworth |
| 8,701,018 B1 | 4/2014 | Keel et al. |
| 2002/0143871 A1 | 10/2002 | Meyer et al. |
| 2002/0160757 A1 | 10/2002 | Shavit et al. |
| 2003/0020749 A1 | 1/2003 | Abu-Hakima et al. |
| 2003/0154212 A1 | 8/2003 | Schirmer et al. |
| 2003/0177190 A1 | 9/2003 | Moody et al. |
| 2003/0195811 A1 | 10/2003 | Hayes, Jr. et al. |
| 2003/0214534 A1 | 11/2003 | Uemura et al. |
| 2003/0233419 A1 | 12/2003 | Beringer |
| 2004/0078190 A1 | 4/2004 | Fass et al. |
| 2004/0153456 A1 | 8/2004 | Charnock et al. |
| 2004/0199529 A1 * | 10/2004 | Clark ................ G06Q 10/107 |
| 2004/0254998 A1 | 12/2004 | Horvitz |
| 2005/0004990 A1 | 1/2005 | Durazo et al. |
| 2005/0018819 A1 | 1/2005 | Schmidt et al. |
| 2005/0080851 A1 | 4/2005 | Kent, Jr. et al. |
| 2005/0080862 A1 | 4/2005 | Kent, Jr. et al. |
| 2005/0102366 A1 | 5/2005 | Kirsch |
| 2005/0114781 A1 | 5/2005 | Brownholtz et al. |
| 2005/0138552 A1 | 6/2005 | Venolia |
| 2005/0193076 A1 | 9/2005 | Flury et al. |
| 2005/0193345 A1 | 9/2005 | Klassen et al. |
| 2005/0228790 A1 | 10/2005 | Ronnewinkel et al. |
| 2005/0246658 A1 | 11/2005 | Uemura et al. |
| 2005/0256968 A1 | 11/2005 | Johnson |
| 2006/0010215 A1 | 1/2006 | Clegg et al. |
| 2006/0031340 A1 | 2/2006 | Mathew et al. |
| 2006/0031347 A1 | 2/2006 | Sahi |
| 2006/0059238 A1 | 3/2006 | Slater et al. |
| 2006/0064410 A1 | 3/2006 | Razza et al. |
| 2006/0069734 A1 | 3/2006 | Gersh et al. |
| 2006/0075044 A1 | 4/2006 | Fox et al. |
| 2006/0095466 A1 | 5/2006 | Stevens et al. |
| 2006/0123360 A1 | 6/2006 | Anwar et al. |
| 2006/0173824 A1 | 8/2006 | Bensky et al. |
| 2006/0173961 A1 | 8/2006 | Turski et al. |
| 2006/0206495 A1 * | 9/2006 | Van Gageldonk ....... G06F 17/30038 |
| 2006/0277504 A1 | 12/2006 | Zinn |
| 2007/0005592 A1 | 1/2007 | Kender et al. |
| 2007/0106729 A1 | 5/2007 | Adams et al. |
| 2007/0156669 A1 | 7/2007 | Marcisio et al. |
| 2007/0262861 A1 * | 11/2007 | Anderson ............ G06Q 10/025 340/539.13 |
| 2007/0277113 A1 | 11/2007 | Agrawal et al. |
| 2007/0299923 A1 | 12/2007 | Skelly et al. |
| 2008/0215687 A1 | 9/2008 | Madnani |
| 2009/0089798 A1 | 4/2009 | Anderson et al. |
| 2010/0030798 A1 | 2/2010 | Kumar et al. |
| 2010/0049806 A1 | 2/2010 | Haynes et al. |
| 2010/0056221 A1 * | 3/2010 | Park ................ G06F 3/048 455/566 |
| 2010/0114855 A1 | 5/2010 | Li et al. |
| 2010/0199180 A1 | 8/2010 | Brichter |
| 2010/0262922 A1 | 10/2010 | Fan et al. |
| 2010/0278453 A1 | 11/2010 | King |
| 2011/0010182 A1 | 1/2011 | Turski et al. |
| 2011/0072363 A1 | 3/2011 | Mandel et al. |
| 2011/0231499 A1 * | 9/2011 | Stovicek ............ H04M 1/72547 709/206 |
| 2011/0289106 A1 | 11/2011 | Rankin, Jr. et al. |
| 2012/0102037 A1 | 4/2012 | Ozonat |
| 2012/0131095 A1 | 5/2012 | Luna et al. |
| 2012/0180021 A1 | 7/2012 | Byrd et al. |
| 2012/0185781 A1 | 7/2012 | Guzman et al. |
| 2012/0185797 A1 | 7/2012 | Thorsen et al. |
| 2012/0198053 A1 | 8/2012 | Ozhan et al. |
| 2012/0204191 A1 | 8/2012 | Shia et al. |
| 2012/0210334 A1 | 8/2012 | Sutedja et al. |
| 2012/0271908 A1 | 10/2012 | Luna et al. |
| 2012/0272160 A1 | 10/2012 | Spivack et al. |
| 2013/0024440 A1 | 1/2013 | Dimassimo et al. |
| 2013/0055099 A1 | 2/2013 | Yao et al. |
| 2013/0055105 A1 * | 2/2013 | Spierer ................ G06Q 10/107 715/752 |
| 2013/0110953 A1 | 5/2013 | Sutedja et al. |
| 2013/0159879 A1 * | 6/2013 | Affronti ............ G06Q 10/107 715/752 |
| 2013/0165165 A1 | 6/2013 | Macek et al. |
| 2013/0166280 A1 | 6/2013 | Quast et al. |
| 2013/0212189 A1 * | 8/2013 | Velissarakos .......... G06Q 10/10 709/206 |
| 2013/0297604 A1 | 11/2013 | Sutedja et al. |
| 2013/0305187 A1 | 11/2013 | Phillips et al. |
| 2013/0325705 A1 | 12/2013 | Laird et al. |
| 2013/0332850 A1 * | 12/2013 | Bovet .................... H04L 51/22 715/752 |
| 2014/0052797 A1 | 2/2014 | Lessard et al. |
| 2014/0096032 A1 * | 4/2014 | Mayblum ............ H04L 51/22 715/752 |

(56) References Cited

U.S. PATENT DOCUMENTS

| | | |
|---|---|---|
| 2014/0115495 A1* | 4/2014 | Wetherell .......... G06F 17/30705 715/752 |
| 2014/0279016 A1 | 9/2014 | Capel et al. |
| 2014/0280619 A1 | 9/2014 | Banatwala et al. |
| 2014/0280635 A1 | 9/2014 | Bengochea et al. |
| 2014/0344711 A1 | 11/2014 | Hallerstrom Sjostedt |
| 2014/0359480 A1 | 12/2014 | Vellal et al. |

\* cited by examiner

500

502 Receive a selection, by a first user, of a subset of message clusters in a plurality of message clusters, where each respective message cluster in the plurality of message clusters is uniquely associated with a corresponding set of clustering rules in a plurality of sets of clustering rules.

504 Assign each respective electronic message in a first plurality of electronic messages, where each respective electronic message in the first plurality of electronic messages is addressed to the first user or is from the first user, to one or more of the message clusters in the subset of message clusters in accordance with the sets of clustering rules, in the plurality of sets of clustering rules, associated with the subset of messaging clusters.

506 The plurality of message clusters comprises one or more system message clusters and the corresponding sets of clustering rules for the one or more system message clusters are applied on a system-wide basis across a plurality of users including the first user.

508 The one or more system message clusters includes a message cluster for personal electronic messages, a message cluster for social electronic messages, a message cluster for electronic messages pertaining to promotions, a message cluster for electronic messages pertaining to updates, or a message cluster for electronic messages pertaining to forums.

510 A first clustering rule for a first system cluster in the one or more system message clusters from the first user is received and electronic messages in the first plurality of electronic messages are assigned to the first system cluster that both (i) satisfy the first clustering rule and (ii) satisfy the set of clustering rules for the first system cluster.

512 The plurality of message clusters comprises one or more user defined message clusters and the corresponding sets of clustering rules for the one or more user defined message clusters are uniquely applied to electronic messages addressed to the first user, or authored by the first user.

514 Receive a preview request associated with a second message cluster in the plurality of message clusters and, responsive to the preview request, format for display a designation of the identity of one or more senders of electronic messages in the first plurality of electronic messages that qualify for inclusion in the second message cluster in accordance with the set of clustering rules associated with the second message cluster.

Figure 5A

SYSTEMS AND METHODS FOR CLUSTERING ELECTRONIC MESSAGES

CROSS REFERENCE TO RELATED APPLICATION

This application claims priority to U.S. Provisional Patent Application No. 61/922,027, entitled "Systems and Methods for Clustering Electronic Messages," filed Dec. 30, 2013, which is hereby incorporated by reference herein in its entirety.

TECHNICAL FIELD

The embodiments disclosed herein relate generally to systems and methods for categorizing and displaying electronic messages.

BACKGROUND

A typical user of a messaging application often receives a large number of electronic messages, such as emails, social network posts, contact information, search queries and calendar entries every day. Such a large number of electronic messages can be cumbersome to navigate through. Messaging application users wish to navigate through a listing of such electronic messages quickly to identify relevant messages. However, the volume of electronic messages makes it difficult to do so. Categorization of such messages into clusters or conversations is useful. However, methods for maintaining user flexibility and control over such categorization are lacking.

The above identified technical problems are reduced or eliminated by the systems and methods disclosed herein.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

FIGS. 5A-5B are example flow charts illustrating methods for displaying messages, in accordance with some embodiments.

SUMMARY

Figure 1:
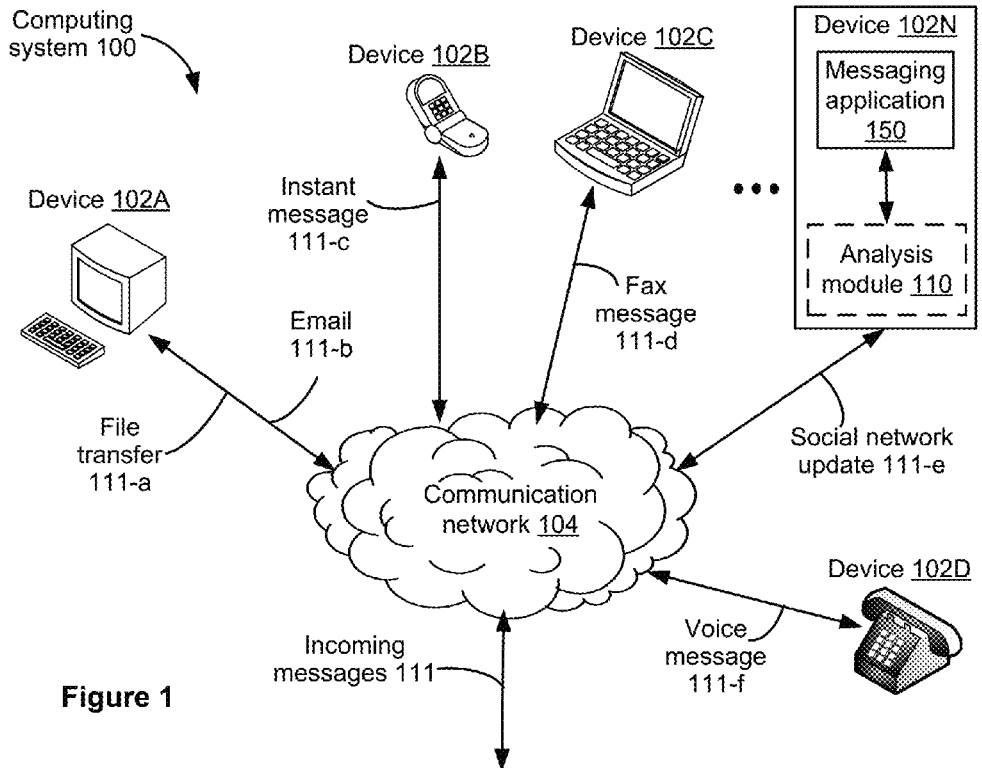
FIG. 1 is an example block diagram illustrating a computing system, in accordance with some embodiments.
Figure 1:
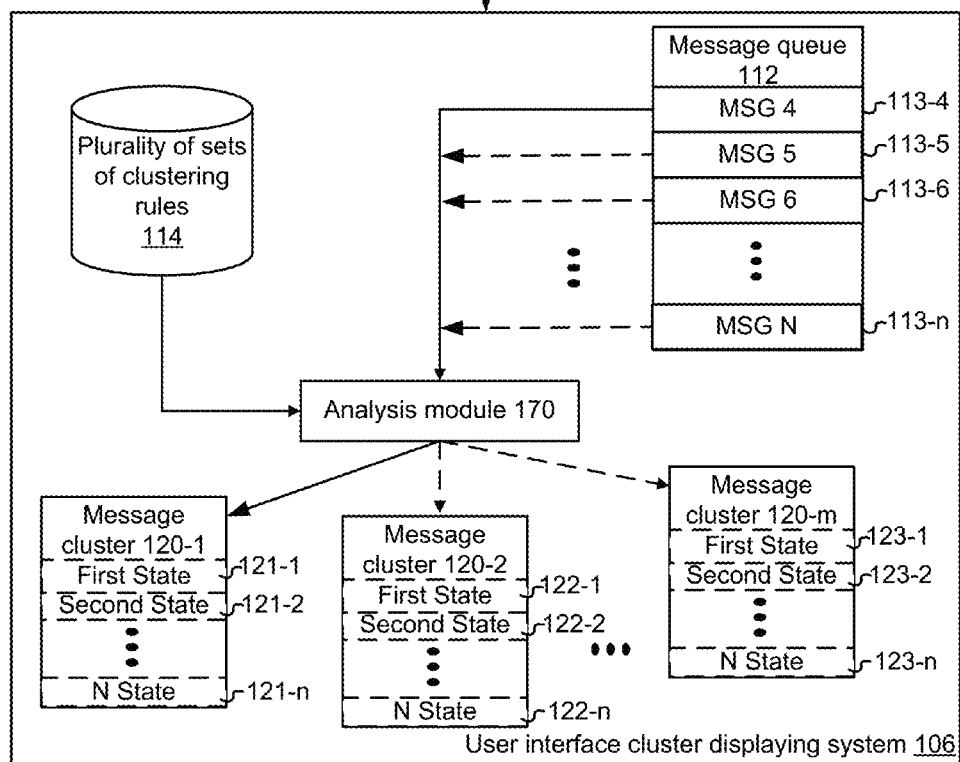

Technical solutions (e.g., computing systems, methods, and non-transitory computer readable storage mediums) for clustering messages are provided in the present application.

One aspect of the present disclosure provides a method comprising, at a computing device having one or more processors and memory storing one or more programs for execution by the one or more processors, of receiving a selection, by a first user, of a subset of message clusters in a plurality of message clusters. Each respective message cluster in the plurality of message clusters is uniquely associated with a corresponding set of clustering rules in a plurality of sets of clustering rules. In the method, each respective electronic message in a first plurality of electronic messages is assigned to one or more of the message clusters in the subset of message clusters selected by the first user in accordance with the sets of clustering rules, in the plurality of sets of clustering rules, associated with the subset of messaging clusters. Each respective electronic message in the first plurality of electronic messages is addressed to the first user or is from the first user. The set of clustering rules for a first message cluster in the subset of message clusters (i) acts to prevent at least some electronic messages in the first plurality of electronic messages from being assigned to the first message cluster and (ii) assigns electronic messages to the first message cluster without regard to content relatedness between electronic messages in the first plurality of electronic messages and electronic messages already in the first message cluster. Further in the method, there is formatted for display, in an electronic message folder, electronic messages in the first message cluster as a first single cluster graphic.

In some embodiments of the present disclosure, the first message cluster comprises a second plurality of electronic messages, the electronic message folder further includes a third plurality of electronic messages not associated with the first message cluster, and the method further comprises, responsive to a predefined user action in connection with the first single cluster graphic, expanding display of the first single cluster graphic by, while maintaining display of information representing the third plurality of electronic messages, formatting for display content of an electronic message in the second plurality of electronic messages.

In some embodiments of the present disclosure, the plurality of message clusters comprises one or more system message clusters and the corresponding sets of clustering rules for the one or more system message clusters are applied on a system-wide basis across a plurality of users including the first user. In some embodiments, the one or more system message clusters includes a message cluster selected from the group consisting of a message cluster for personal electronic messages, a message cluster for social electronic messages, a message cluster for electronic messages pertaining to promotions, a message cluster for electronic messages pertaining to updates, and a message cluster for electronic messages pertaining to forums. In some embodiments, a first clustering rule for a first system cluster in the one or more system message clusters is received from the first user. In such embodiments, electronic messages in the first plurality of electronic messages are assigned to the first system cluster that both (i) satisfy the first clustering rule and (ii) satisfy the set of clustering rules for the first system cluster.

In some embodiments of the present disclosure, the plurality of message clusters comprises one or more user defined message clusters and the corresponding set of clustering rules for the one or more user defined message clusters are uniquely applied to electronic messages addressed to the first user, or authored by the first user, in order to determine which electronic messages are to be assigned to the one or more user defined message clusters.

In some embodiments of the present disclosure, a preview request associated with a second message cluster in the plurality of message clusters is received. Responsive to the preview request, a designation of the identity of one or more senders of electronic messages in the first plurality of electronic messages that qualify for inclusion in the second message cluster in accordance with the set of clustering rules associated with the second message cluster is formatted for display.

In some embodiments of the present disclosure, each message cluster in the plurality of message clusters is uniquely associated with a message category in a plurality of message categories and the method further comprises receiving a search request that specifies a message category in the plurality of message categories and, responsive to the search request, formatting for display a designation of the identity of each electronic message in the first plurality of electronic messages that qualifies for assignment in the message cluster associated with the message category. In some embodiments the received message category is one of personal, social, promotions, updates and forums.

In some embodiments of the present disclosure, each message cluster in the plurality of message clusters is uniquely associated with a message category in a plurality of message categories and the method further comprises receiving a notification designation that specifies a message category in the plurality of message categories. Responsive to the notification designation, an alert is formatted for display upon receipt of an electronic message that qualifies for assignment to the message cluster associated with the message category. In some embodiments, the message category is one of personal, social, promotions, updates or forums. In some embodiments, the notification is conditional upon a device associated with the first user so that the notification is suppressed when the first user is using a device in a first device class and the notification is made when the first user is using a device in a second device class. In some embodiments, the first device class is one of desktop or mobile and the second device class is other than the first device class and is one of desktop or mobile.

In other aspects of the present disclosure, computing systems and non-transitory computer storage mediums for executing one or more steps of any of the above-described methods are also disclosed.

DETAILED DESCRIPTION

As explained above, a typical user often receives and/or sends a large number of electronic messages, such as emails, social network posts, contact information, search queries and calendar entries every day. Such a large number of electronic messages can be cumbersome to navigate through. In particular, when a user receives a large number of incoming messages, the user often needs to mark all of the incoming messages (e.g., as a read message) so that the user does not need to revisit the same messages. However, this is time-consuming and inefficient.

Message clustering simplifies a user interface for displaying messages, because clustered messages are represented by a single user interface object, instead using a single user interface object for each message in the group.

The embodiments described herein provide various technical solutions to improving access to electronic messages, and in particular to the above-identified problems, by providing techniques for displaying electronic messages to a user. Instead of requiring a user to manually categorize every electronic message of interest, a plurality of message clusters is defined. Each message cluster is associated with a set of clustering rules that dictate which messages are to be assigned to the message clusters. In some embodiments it is possible for a single electronic message to be categorized into more than one message cluster. Once defined, the sets of clustering rules act to cluster messages into the appropriate message clusters in the plurality of message clusters. Clusters are described in U.S. patent application Ser. No. 14/139,205, filed Dec. 23, 2013, entitled "Systems and Methods for Clustering Electronic Messages," which is hereby incorporated by reference herein in its entirety. Whereas conversations aggregate electronic messages based on content relatedness (e.g., header content relatedness) between messages already in the conversations and messages being considered for assignment to conversations, electronic messages are organized into clusters without regard to content relatedness between messages within the clusters and messages being considered for assignment to the clusters. For example, a string of messages from and to a first and second user or group of users are good candidates for inclusion in a conversation because of the content relatedness between the messages in the conversations and the messages being considered for the conversations. However, absent some additional criterion or factor, the relatedness in the source and destination of these messages does not serve as a basis for inclusion in the same cluster.

Details of embodiments are now described in relation to the Figures.

FIG. 1 is a block diagram illustrating a computing system 100, in accordance with some embodiments.

In some embodiments, the computing system 100 includes one or more devices 102 (e.g., device 102A, 102B, 102C, 102D . . . , and 102N), a communication network 104, and a user cluster displaying system 106 (also called herein a user displaying system). In some embodiments, a device 102 is a phone (mobile or landline, smart phone or otherwise), a tablet, a computer (mobile or otherwise), a fax machine, or an audio/video recorder.

In some embodiments, a device 102 obtains an electronic message from (e.g., drafted or generated by) a user of the device 102, and transmits the electronic message to the user interface cluster displaying system 106 for displaying with other electronic messages. For example, after determining that user Jack sends an electronic message to user Mary, the device 102 transmits the electronic message to the user interface cluster displaying system 106, which processes the electronic message into a first single cluster graphic for display in a listing of electronic messages for Mary.

In some embodiments, an electronic message is a file transfer 111-$a$ (e.g., a photo, document, or video download/upload), an email 111-$b$, an instant message 111-$c$ (e.g., a GOOGLE HANGOUT message), a fax message 111-$d$, a social network update 111-$e$ (e.g., a GOOGLE PLUS update), or a voice message 111-$f$.

In some embodiments, a device 102 includes a messaging application 150 and optionally an analysis module 110. In some embodiments, the messaging application 150 processes incoming and outgoing electronic messages into and from the device 102, such as an outgoing email sent by a user of the device 102 to another user, and a chat message by another user to a user of the device 102. In some embodiments the messaging application 150 is an e-mail application. In some embodiments, the analysis module 110 resident on the device 102 balances processing load with the analysis module 170 resident on the user interface object displaying system 106. For example, after a user requests to send out a total of six emails, the analysis module 110 on the device 102 processes the first three emails (which, in some embodiments, include plain text emails, e.g., without HTML content or attachments, and thus might require less processing power), and the analysis module 170 on the user interface object displaying system 106 processes the remaining three emails (which, in some embodiments, include HTML content or attachments, and thus might require more processing power).

In some embodiments, the communication network 104 interconnects one or more devices 102 with each other, and with the user interface object displaying system 106. In some embodiments, the communication network 104 optionally includes the Internet, one or more local area networks (LANs), one or more wide area networks (WANs), other types of networks, or a combination of such networks.

Figure 3:
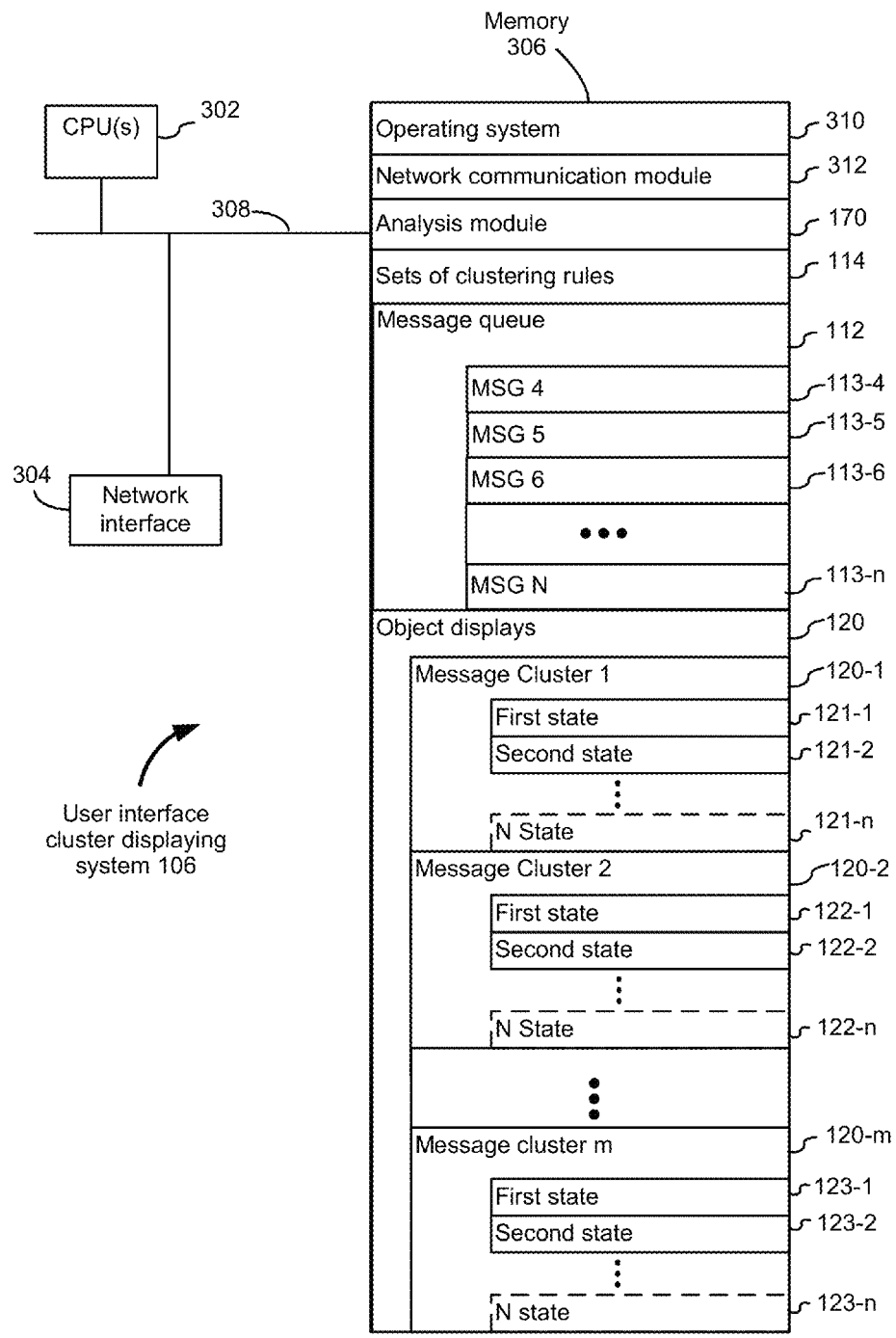
FIG. 3 is an example block diagram illustrating a user interface object displaying system, in accordance with some embodiments.

With reference to FIGS. 1 and 3, in some embodiments, the user interface cluster displaying system 106 includes an analysis module 170, a message queue 112 and a plurality of sets of clustering rules 114 (e.g., user- or system-provided rules).

In some embodiments, the user interface cluster displaying system 106 analyzes content of incoming or outgoing electronic messages (e.g., incoming messages 111), and assigns these electronic messages to one or more message clusters (e.g., message clusters 120-1, 120-2 . . . 120-m) in accordance with the respective plurality of sets of clustering rules 114. Each respective message cluster 120 is uniquely associated with a corresponding set of clustering rules in a plurality of sets of clustering rules 114. A message cluster (e.g., the message cluster 120-1) corresponds to more than one electronic messages, with one or more display states (e.g., states 121-1, 121-2 . . . 121-n). For example, after analyzing the message body of an electronic message, the user interface cluster displaying system 106 determines (e.g., with a 90% confidence level) that the electronic message is a "Promotion" message (e.g., an email with advertising materials), and accordingly assigns the electronic message to a "Promotion" message cluster (e.g., the message cluster 120-2) in accordance with the set of clustering rules associated with message cluster 120-2. In some embodiments, assigning an electronic message to a respective message cluster 120 includes assigning a label or category (a "Personal," "Social," "Promotions," "Updates," or "Forums" label) that represents the respective message cluster 120. In some embodiments, a message cluster (e.g., message cluster 120-1) has at least three display states, a first display state (e.g., 121-1) displaying a short text-based summary of the various electronic messages in the cluster 120-1, a second display state (e.g., 121-2) displaying a listing of the electronic messages in the cluster 120-1 with a subset of the text for each respective electronic message, and a third display state (e.g., 121-3) comprising the full text of the body of one of the electronic messages in the cluster 120-1.

In some embodiments, the analysis module 170 analyzes an electronic message against the plurality of sets of clustering rules 114, to determine how to display the electronic message. For example, an incoming electronic message is first analyzed to determine if it can be displayed as a part of one or more existing clusters 120 (e.g., clusters 120-1 through 120-m). In some embodiments, the analysis module 170 also determines and updates one or more display states for the respective message clusters of the plurality of message clusters (e.g., clusters 120-1 . . . 120-m).

Advantageously, each respective user of computing system 100 is able to select which clusters 120 will be used to cluster electronic messages associated with the respective user. For example, in some embodiments, user interface cluster displaying system 106 receives a selection, by a first user of computing system 100, of a subset of message clusters in a plurality of possible message clusters. Each respective message cluster 120 in the plurality of message clusters is uniquely associated with a corresponding set of clustering rules in the plurality of sets of clustering rules 114. Each respective electronic message 113 in a first plurality of electronic messages (e.g., the messages in message queue 112) is assigned to one or more of the message clusters in the subset of message clusters in accordance with the sets of clustering rules, in the plurality of sets of clustering rules 114, associated with the subset of messaging clusters selected by the user. In some embodiments each respective electronic message in the first plurality of electronic messages is addressed to the first user. In some embodiments each respective electronic message in the first plurality of electronic messages is addressed to the first user or is from the first user. The set of clustering rules for a first message cluster 120 in the subset of message clusters (i) acts to prevent at least some electronic messages in the first plurality of electronic messages from being assigned to the first message cluster and (ii) assigns electronic messages to the first message cluster without regard to content relatedness between electronic messages in the first plurality of electronic messages and electronic messages already in the first message cluster. There is formatted for display, in an electronic message folder, electronic messages in the first message cluster as a first single cluster graphic. This first single cluster graphic can take any of a variety of forms or shapes. For example, in some embodiments, the first single cluster graphic can be any of the cluster states described above. In another example, in some embodiments, the first single cluster graphic can be a tab, icon or other graphical representation.

In some embodiments of the present disclosure, the plurality of message clusters comprises one or more system message clusters and the corresponding sets of clustering rules for the one or more system message clusters are applied on a system-wide basis across a plurality of users including the first user. In some embodiments, the one or more system message clusters includes a message cluster selected from the group consisting of a message cluster for personal electronic messages, a message cluster for social electronic messages, a message cluster for electronic messages pertaining to promotions, a message cluster for electronic messages pertaining to updates, and a message cluster for electronic messages pertaining to forums. In some embodiments, a first clustering rule for a first system cluster in the one or more system message clusters is received from the first user. In such embodiments, electronic messages in the first plurality of electronic messages are assigned to the first system cluster that both (i) satisfy the first clustering rule and (ii) satisfy the set of clustering rules for the first system cluster.

In some embodiments of the present disclosure, the plurality of message clusters comprises one or more user defined message clusters and the corresponding set of clustering rules for the one or more user defined message clusters are uniquely applied to electronic messages addressed to the first user, or authored by the first user, in order to determine which electronic messages are to be assigned to the one or more user defined message clusters.

In some embodiments of the present disclosure, a preview request associated with a second message cluster in the plurality of message clusters is received. Responsive to the preview request, a designation of the identity of one or more senders of electronic messages in the first plurality of electronic messages that qualify for inclusion in the second message cluster in accordance with the set of clustering rules associated with the second message cluster is formatted for display.

In some embodiments of the present disclosure, each message cluster in the plurality of message clusters is uniquely associated with a message category in a plurality of message categories and the method further comprises receiving a search request that specifies a message category in the plurality of message categories and, responsive to the search request, formatting for display a designation of the identity of each electronic message in the first plurality of electronic messages that qualifies for assignment in the message cluster associated with the message category. In some embodiments the received message category is one of personal, social, promotions, updates and forums.

In some embodiments of the present disclosure, each message cluster in the plurality of message clusters is uniquely associated with a message category in a plurality of message categories and the method further comprises receiving a notification designation that specifies a message category in the plurality of message categories. Responsive to the notification designation, an alert is formatted for display, or an audible alarm or a vibration alert is prepared upon receipt of an electronic message that qualifies for assignment to the message cluster associated with the message category. In some embodiments, the message category is one of personal, social, promotions, updates or forums. In some embodiments, the notification is conditional upon a device associated with the first user so that the notification is suppressed when the first user is using a device in a first device class and the notification is made when the first user is using a device in a second device class. In some embodiments, the first device class is one of desktop or mobile and the second device class is other than the first device class and is one of desktop or mobile.

In some embodiments, some of the message clusters are system clusters, meaning that the sets of clustering rules associated with such message clusters are available for use by all users of the computing system 100. To illustrate, in some embodiments, the plurality of message clusters from which a user may use to organize their electronic messages comprises one or more system message clusters and the corresponding sets of clustering rules for the one or more system message clusters are applied on a system-wide basis across a plurality of users including the first user that uses computing system 100. In some embodiments, the one or more system message clusters includes a message cluster 120 selected from the group consisting of a message cluster for personal electronic messages, a message cluster for social electronic messages, a message cluster for electronic messages pertaining to promotions, a message cluster for electronic messages pertaining to updates, and a message cluster for electronic messages pertaining to forums.

In some embodiments, users can start with system clusters but customize the set of clustering rules associated with such clusters in order to personalize the clusters for individual use. To illustrate, in some embodiments, a first clustering rule for a first system cluster in the one or more system message clusters is received from the first user. In such embodiments, electronic messages in the first plurality of electronic messages are assigned to the first system cluster that both (i) satisfy the first clustering rule and (ii) satisfy the set of clustering rules for the first system cluster. In some embodiments the first clustering rule, or other rules provided by the user act to negate a clustering rule that is associated with a system cluster.

In some embodiments, a user may add their own custom clusters. To illustrate, in some embodiments of the present disclosure, the plurality of message clusters that the first user uses to organize their electronic messages comprises one or more user defined message clusters and the corresponding set of clustering rules for the one or more user defined message clusters are uniquely applied to electronic messages addressed to the first user, or authored by the first user, in order to determine which electronic messages are to be assigned to the one or more user defined message clusters. In some embodiments, the user may share the sets of clustering rules with other users of computing system 100 so that they too may have such custom clusters without going through the trouble of building up the custom set of clustering rules.

In some embodiments, a user may sample or "preview" a cluster 120 before committing to using it to organize their electronic messages. To illustrate, in some embodiments of the present disclosure, a preview request associated with a designated message cluster 120 in the plurality of message clusters is received from a user of a device 102 by user interface cluster displaying system 106. Responsive to the preview request, a designation of the identity of one or more senders of electronic messages in a plurality of electronic messages that are addressed to this user (e.g., messages 113 in message queue 112 that are addressed to the user) that qualify for inclusion in the designated message cluster in accordance with the set of clustering rules associated with the designated message cluster is formatted for display. This designation of one or more senders is transmitted to the device 102 for display to the user. In this way, the user can see who the senders would be for a given cluster. Based on this sampling, the user can decide whether or not to use the cluster.

Typically, each message cluster 120 represents a category of messages. In some embodiments, one of the clusters is a catchall category ("e.g., and "inbox") that includes all incoming messages unless such messages have been included in another message cluster 120. In some embodiments, each electronic message 113 is assigned to a single message cluster 120. In some embodiments, each electronic message 113 is assigned to one or more message cluster 120. In some embodiments, some electronic messages 113 are not assigned to any message cluster 120.

In some embodiments of the present disclosure, each message cluster 120 is uniquely associated with a message category in a plurality of message categories and the user of a device 102 provides a search request that specifies a message category in the plurality of message categories. Responsive to the search request, there is formatted for display a designation of the identity of each electronic message in the plurality of electronic messages associated with the first user that qualifies for assignment in the message cluster associated with the message category. In some embodiments the received message category is one of personal, social, promotions, updates and forums.

In some embodiments of the present disclosure, each message cluster 120 is uniquely associated with a message category in a plurality of message categories and the method further comprises receiving a notification designation that specifies a message category in the plurality of message categories. Responsive to the notification designation, an alert is formatted for display, or an audible alert or vibrational alert is prepared upon receipt of an electronic message that qualifies for assignment to the message cluster associated with the message category. In some embodiments, the message category is one of personal, social, promotions, updates or forums. In some embodiments, the notification is conditional upon a device associated with the first user so that the notification is suppressed when the first user is using a device 102 in a first device class and the notification is made when the first user is using a device 102 in a second device class. In some embodiments, the first device class is one of desktop or mobile and the second device class is other than the first device class and is one of desktop or mobile.

In some embodiments, the analysis module 110 is a software or hardware component resident on the device 102, such as a software package/application or a hardware chipset, for clustering electronic messages, and the analysis module 170 on the user interface object displaying system 106 is not used. In some embodiments, the analysis module 110 is not present and the analysis module 170, which exists separate from or independent of the device 102 is used (e.g., a GOOGLE mail processing server that is connected with but not part of the device 102, e.g., in the manner depicted in FIG. 1 with the analysis module 170). In still other embodiments, the analysis module 110 is a software or hardware component resident on the device 102, such as a software package/application or a hardware chipset, for displaying electronic messages, and the analysis module 170 on the user interface object displaying system 106 is also used. That is, both the analysis module 110 on the device 102 and the analysis module 170 on the user interface object displaying system 106 are used. For instance, in some such embodiments some cluster rules (e.g. user-specified rules) are implemented on the device 102 and implemented using the analysis module 110 and some clustering rules 114 (e.g., system-provided rules) are implemented on the user interface cluster displaying system 106 and implemented using the analysis module 170. In some embodiments, some clustering rules are generated on the user interface displaying system 106 and distributed to the devices 102 for enforcement and/or implementation by the analysis module 110. For instance, a set of clustering rules can be distributed in the form of a profile or set of rules. In some embodiments, such distribution of rules to devices 102 occurs on a recurring basis (e.g., periodic or nonperiodic basis).

In some embodiments, the message queue 112 stores one or more electronic messages awaiting analysis by the analysis module 170, such as MSG 4, MSG 5, MSG 6, . . . and MSG N (FIG. 1, 113-4 . . . 113-*n*). In some embodiments, the message queue 112 includes different types of electronic messages, such as a file transfer 111-*a* (e.g., a photo, document, or video upload), an email 111-*b*, an instant message 111-*c* (e.g., a Google HANGOUT message), a fax message 111-*d*, a social network update 111-*e* (e.g., a GOOGLE PLUS update), a voice message 111-*f*. In some embodiments, the message queue 112 only includes electronic messages. In some embodiments, the message queue 112 only includes Email messages.

Figure 2:
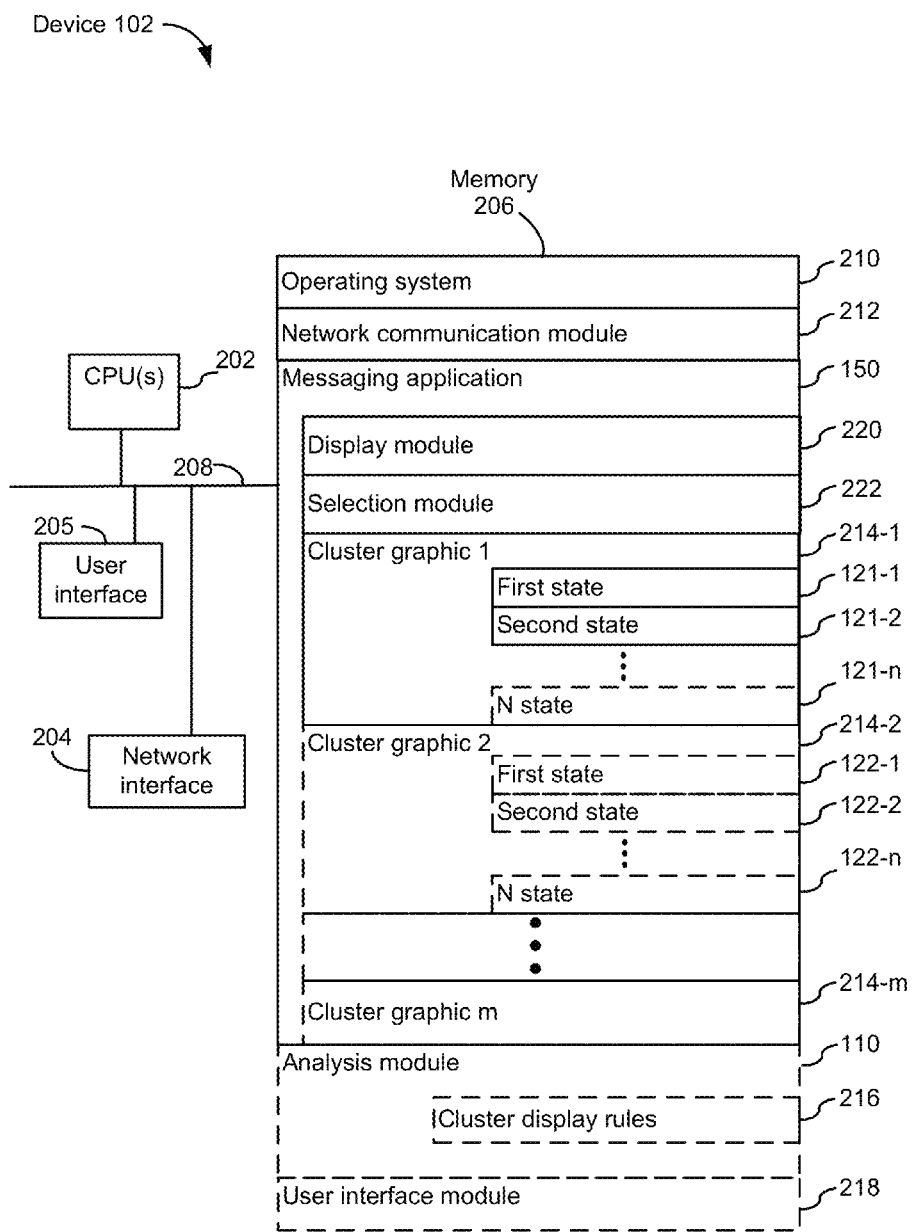
FIG. 2 is an example block diagram illustrating a computing device, in accordance with some embodiments.

FIG. 2 is a block diagram illustrating a computing device 102, in accordance with some embodiments. The device 102 in some embodiments includes one or more processing units CPU(s) 202 (also referred to as processors), one or more network interfaces 204, a user interface 205, a memory 206, and one or more communication buses 208 for interconnecting these components. The communication buses 208 optionally include circuitry (sometimes called a chipset) that interconnects and controls communications between system components. In some embodiments, the user interface 205 includes an input device (e.g., a keyboard, a mouse, a touchpad, a track pad, and a touch screen) for a user to interact with the device 102.

The memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 202. The memory 206, or alternatively the non-volatile memory device(s) within the memory 206, comprises a non-transitory computer readable storage medium. In some embodiments, the memory 206 or alternatively the non-transitory computer readable storage medium stores the following programs, modules and data structures, or a subset thereof:

- an operating system 210, which includes procedures for handling various basic system services and for performing hardware dependent tasks;
- a network communication module (or instructions) 212 for connecting the device 102 with other devices (e.g., the user interface object displaying system 106 and the devices 102B through 102N) via one or more network interfaces 204 (wired or wireless), or the communication network 104 (FIG. 1);
- a messaging application 150 for processing and displaying incoming and outgoing electronic messages;
- optionally an analysis module 110 for analyzing content of (e.g., income and outgoing) electronic messages, and assigning electronic messages to one or more cluster graphics in accordance with therewith, in accordance with cluster display rules 216; and
- optionally a user interface module 218 for displaying user interface components or controls (e.g., textbox, button, radio button, drop-down list) to a user.

In some embodiments, the messaging application 150 includes:

- a display module 220 for displaying and modifying one or more single cluster graphics that represent clusters of messages; and
- a selection module 222 for receiving a selection of one or more clusters (e.g., with a user input using the user interface 205).

In some embodiments, the display module 220 includes one or more sub-modules, such as (i) a user interface cluster display sub-module that initiates display of one or more user interface cluster graphics that represents clusters of messages.

In some embodiments, the messaging application 150 displays electronic messages using one or more user interface cluster graphics. In some embodiments, the one or more user interface cluster graphics include one or more of:

- a user interface cluster graphic 1 (214-1) that visually displays any one of a First Display State (121-1), Second Display State (121-2), up to an Nth Display State (121-*n*)—where user interface cluster graphic 1 comprises one or more electronic messages;
- a user interface cluster graphic 2 (214-2) that visually displays any one of a First Display State (122-1), Second Display State (122-2), up to an Nth Display State (122-*n*)—where user interface cluster graphic 2 comprises one or more electronic messages; and
- a user interface cluster graphic m (214-*m*) that visually displays any one of a number of display states—where user interface object graphic m comprises one or more electronic messages.

In some embodiments, when the messaging application 150 includes multiple user interface cluster graphics, a first user interface cluster graphic (e.g., the user interface cluster graphic 1 (214-1)) is distinct from a second user interface cluster graphic (e.g., the user interface object graphic 2 (214-2)). In some embodiments, when the messaging application 150 includes multiple user interface cluster graphics, the second user interface cluster graphic does not include any electronic message in the first user interface cluster graphic. In some embodiments, when the messaging application 150 includes multiple user interface cluster graphics, the second user interface cluster graphic includes one or more electronic messages that are also in the first user interface cluster graphic.

In some embodiments, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various embodiments. In some embodiments, the memory 206 stores a subset of the modules and data structures identified above. Furthermore, the memory 206 may store additional modules and data structures not described above.

FIG. 3 is a block diagram illustrating a user interface cluster displaying system 106, in accordance with some embodiments. The user interface cluster displaying system 106 typically includes one or more processing units CPU(s) 302 (also referred to as processors), one or more network interfaces 304, memory 306, and one or more communication buses 308 for interconnecting these components. The communication buses 308 optionally include circuitry (sometimes called a chipset) that interconnects and controls communications between system components. The memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 306 optionally includes one or more storage devices remotely located from CPU(s) 302. The memory 306, or alternatively the non-volatile memory device(s) within the memory 306, comprises a non-transitory computer readable storage medium. In some embodiments, the memory 306 or alternatively the non-transitory computer readable storage medium stores the following programs, modules and data structures, or a subset thereof:

- an operating system 310, which includes procedures for handling various basic system services and for performing hardware dependent tasks;
- a network communication module (or instructions) 312 for connecting the user interface cluster displaying system 106 with other devices (e.g., the devices 102) via the one or more network interfaces 304 (wired or wireless), or the communication network 104 (FIG. 1);
- an analysis module 170 for conducting a content-based analysis on (e.g., incoming and outgoing) electronic messages and assigning electronic messages to one or more user interface message clusters in accordance with the content based analysis;
- a message queue 112 for storing electronic messages awaiting processing by the analysis module 170, e.g., MSG 4, MSG 5, MSG 6, . . . and MSG n (113-4 . . . 113-$n$);
- a plurality of sets of clustering rules 114, which assigns electronic messages to one or more message clusters;
- one or more message clusters 120 for electronic messages assigned thereto, an exemplary embodiment of which includes:
  - a message cluster 120-1, for electronic message(s) assigned thereto, that can be displayed in any one of the following display states:
    - first display state 121-1;
    - second display state 121-2; and up to
    - an $n^{th}$ display state 121-$n$;
  - a message cluster 120-2, for electronic message(s) assigned thereto, that can be displayed in any one of the following display states:
    - first display state 122-1;
    - second display state 122-2; and up to
    - an $n^{th}$ display state 122-$n$; and
  - a message cluster 120-$m$, for electronic message(s) assigned thereto, that can be displayed in any one of the following display states:
    - first display state 123-1;
    - second display state 123-2; and up to
    - an $n^{th}$ display state 123-$n$.

In some embodiments, a message cluster 120 can only be displayed in a single display state.

In some embodiments, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various embodiments. In some embodiments, the memory 306 optionally stores a subset of the modules and data structures identified above. Furthermore, the memory 306 may store additional modules and data structures not described above.

Although FIGS. 2 and 3 show a "device 102" and a "user interface cluster displaying system 106," respectively, FIGS. 2 and 3 are intended more as functional description of the various features which may be present in computer systems than as a structural schematic of the embodiments described herein. In practice, and as recognized by those of ordinary skill in the art, items shown separately could be combined and some items could be separated.

FIGS. 4A-4E illustrate depictions of example user interfaces 400 of a messaging application 150 for displaying electronic messages in accordance with some embodiments. In some embodiments, the example user interfaces 400 illustrated in FIGS. 4A-4E are displayed by a computing device (e.g., computing device 102, FIG. 2).

Figure 4A:
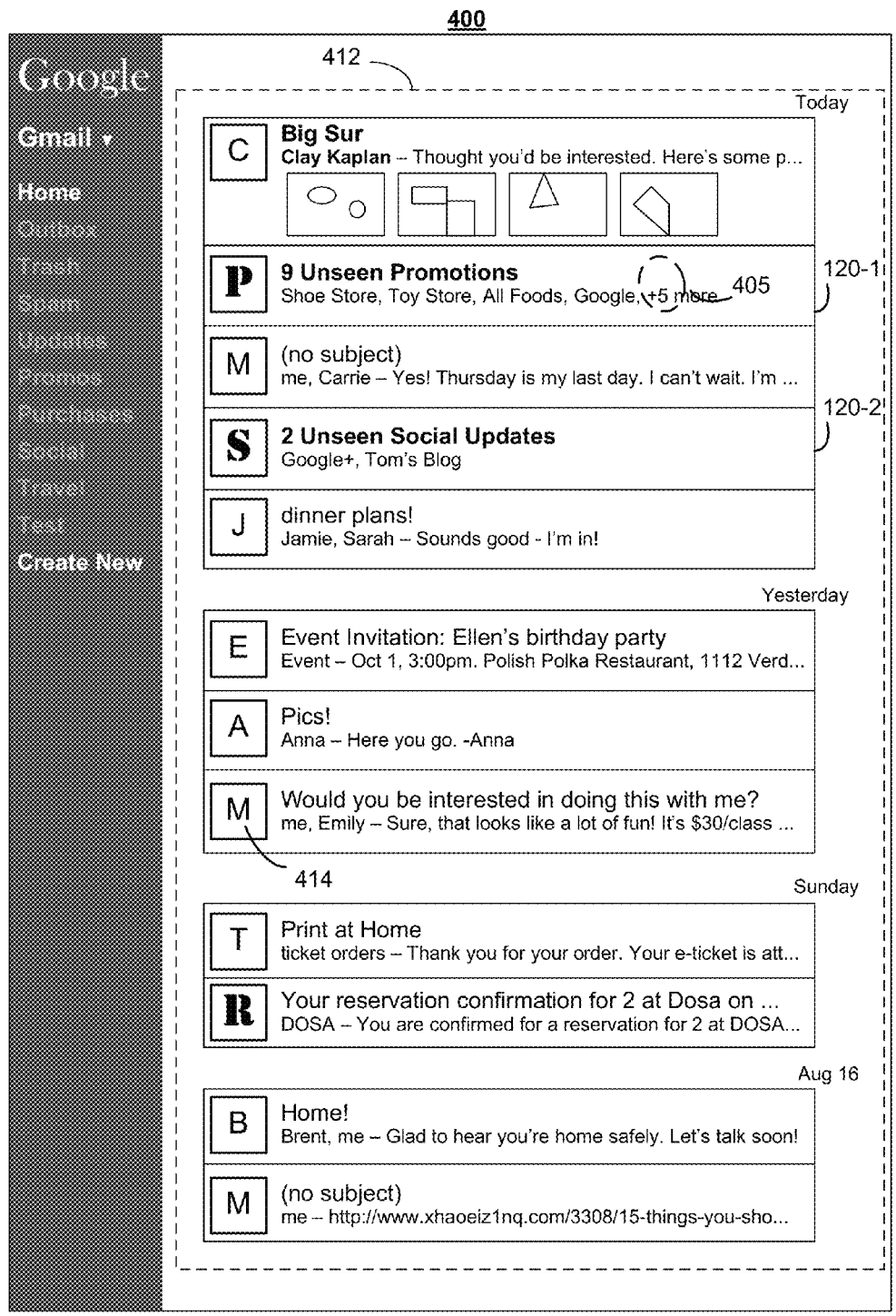
FIGS. 4A-4E are depictions of example user interfaces of a messaging application for displaying electronic messages in accordance with some embodiments.

An example user interface 400 for a messaging application is shown in FIG. 4A. In some embodiments, the example user interface 400 comprises an electronic message folder 412. In some embodiments, the electronic message folder 412 is displayed in an electronic message folder panel (e.g., the portion of user interface 400 with a white background in FIG. 4A). The electronic message folder 412 comprises a plurality of message clusters, such as a message clusters 120-1 ("Promotions") and 120-2 ("Social Updates"). The electronic message folder 412 of FIG. 4A is the home inbox of a user. Accordingly, in some embodiments the electronic message folder 412 of FIG. 4A further includes electronic messages that are not associated with message clusters 120-1 and 120-2.

In some embodiments, a respective message cluster 120 is visually distinct in the electronic message folder 412 and represents one or more corresponding electronic messages in a plurality of electronic messages. For example, the message cluster 120-1 corresponds to a group (also called herein a cluster) of electronic messages (e.g., emails) having a collective association. In this case, the group of emails corresponding to the message cluster 120-1 includes nine email messages relating to "Promotions," such as retail sales, newsletters from stores or coupons from businesses. In another example, the message cluster 120-2 corresponds to a group of electronic messages relating to "Social Updates," such as postings on GOOGLE+, or other social networks (e.g., blogs).

In some embodiments, respective message cluster 120 is displayed with one or more indicia of a number of electronic messages, in a group of electronic messages associated with the respective message cluster, that have a predefined display status. For example, the message cluster 120-1 shown in FIG. 4A is displayed with an indication of a number of electronic messages that have not been previously displayed (e.g., "9 Unseen") in the group of electronic messages associated with the message cluster, and the message cluster 120-2 is displayed with an indication of a number of electronic messages that have not been previously displayed (e.g., "2 Unseen") in the group of electronic messages associated with message cluster 120-2.

FIG. 4A also depicts a plurality of message clusters displayed in their respective "first display state." For example, the message cluster 120-1 is displayed in first display state and the message cluster 120-2 is displayed in first display state. In some embodiments, a respective message cluster in the first display state includes at least a subset of the text of the one or more electronic messages associated with the respective message cluster. In some embodiments, a respective message cluster in the first state is displayed with all the text of one electronic message associated with the respective message cluster. In some embodiments, a respective message cluster in the first display state includes a subset of the body text of the most recent electronic message (e.g., a most recently received electronic message) in the plurality of electronic messages associated with the respective message cluster.

FIG. 4A also illustrates detection of a user input 405 (e.g., a touch input, a mouse click, etc.) on the electronic message folder. In FIG. 4A, the user input 405 is detected on the message cluster 120-1, corresponding to a user selection of the message cluster 120-1.

Figure 4B:
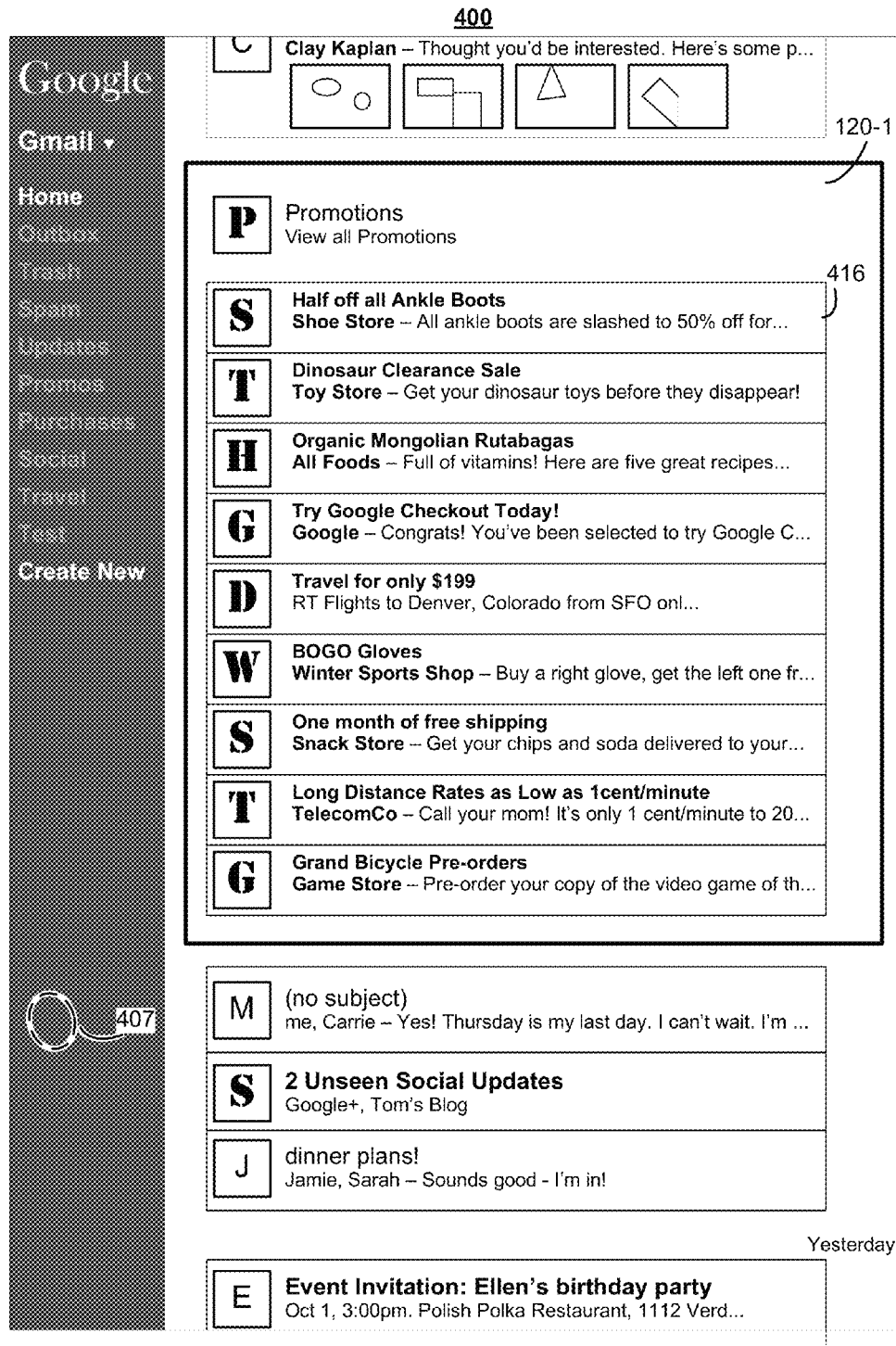

FIG. 4B illustrates that, in response to detecting user selection of the message cluster 120-1, the message cluster 120-1 in a second state is displayed. Display of the message cluster 120-1 in the second state includes concurrent display of multiple electronic messages in the group of electronic messages associated with the message cluster 120-1. In some embodiments, display of a message cluster in the second state includes concurrent display of all electronic messages in the group of electronic messages associated with the message cluster. For example, in FIG. 4B, display of the message cluster 120-1 in the second state includes display of all nine of the electronic messages that are associated with the message cluster 120-1. In some embodiments, display of a respective message cluster in the second state includes display of only a subset of electronic messages in the group of electronic messages associated with the message cluster. For example, in some embodiments, when display of all of the electronic messages that are associated with a message cluster exceeds a display size of a user interface, only a subset of the electronic messages is displayed.

In some embodiments, displaying multiple electronic messages in a message cluster includes displaying, for each such respective electronic message, at least a subset of a text of the respective electronic message. In some embodiments, displaying multiple electronic messages associated with a message cluster includes foregoing displaying the entire text of the multiple electronic messages. For example, as illustrated in FIG. 4B, display of an electronic message 416 includes display of a subset of a text of the electronic message 416. Thus, in some embodiments, all nine of the electronic messages that are associated with the message cluster 120-1 are deemed to be displayed, even though only a subset of a text is displayed for each of the nine electronic messages.

FIG. 4B also illustrates detection of a user input 407 (e.g., a touch input, a mouse click, etc.) at a location, on the example user interface 400, that does not correspond to the electronic message list 412.

Figure 4C:
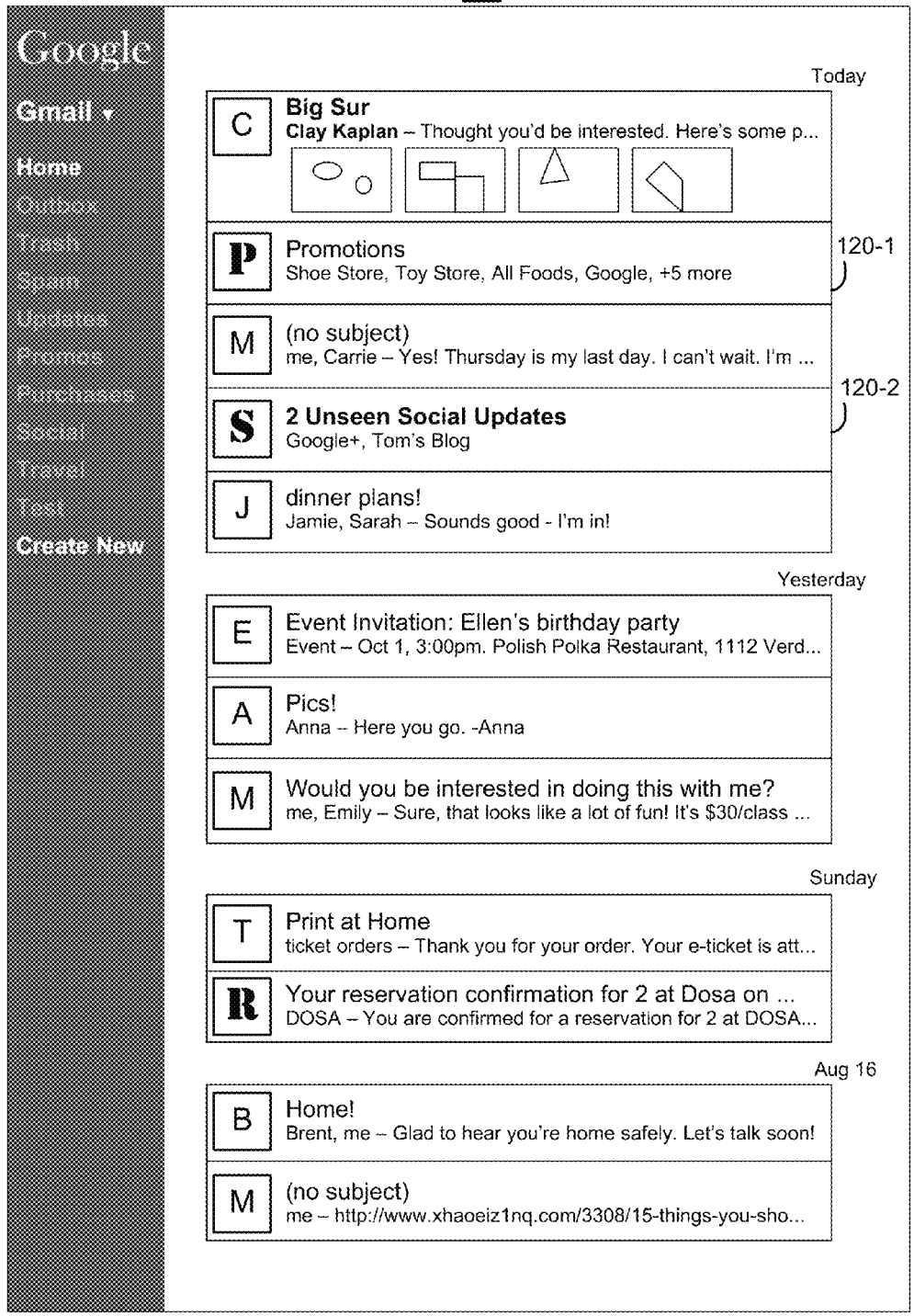

FIG. 4C shows an exemplary response to detecting the user input 407 (FIG. 4B) at a location that does not correspond to the electronic message folder 412. Responsive to user input 407, in FIG. 4C, display of the message cluster 120-1 in the second state is replaced with display of the message cluster 120-1 in a third state. Similar to the first state of the message cluster 120-1 shown in FIG. 4A, the third state corresponds to a group of electronic messages pertaining to "Promotions." However, while the message cluster 120-1 in the first state shown in FIG. 4A is displayed with an indication of a number of electronic messages that have not been previously displayed (e.g., "9 Unseen") in the group of electronic messages associated with message cluster 120-1, the message cluster 120-1 in the third state as shown in FIG. 4C is displayed without an indication of a number of electronic messages that have not been previously displayed, because all the messages associated with the message cluster 120-1 have now been displayed (with the display of the message cluster 120-1 in the second state in FIG. 4B).

Figure 4D:
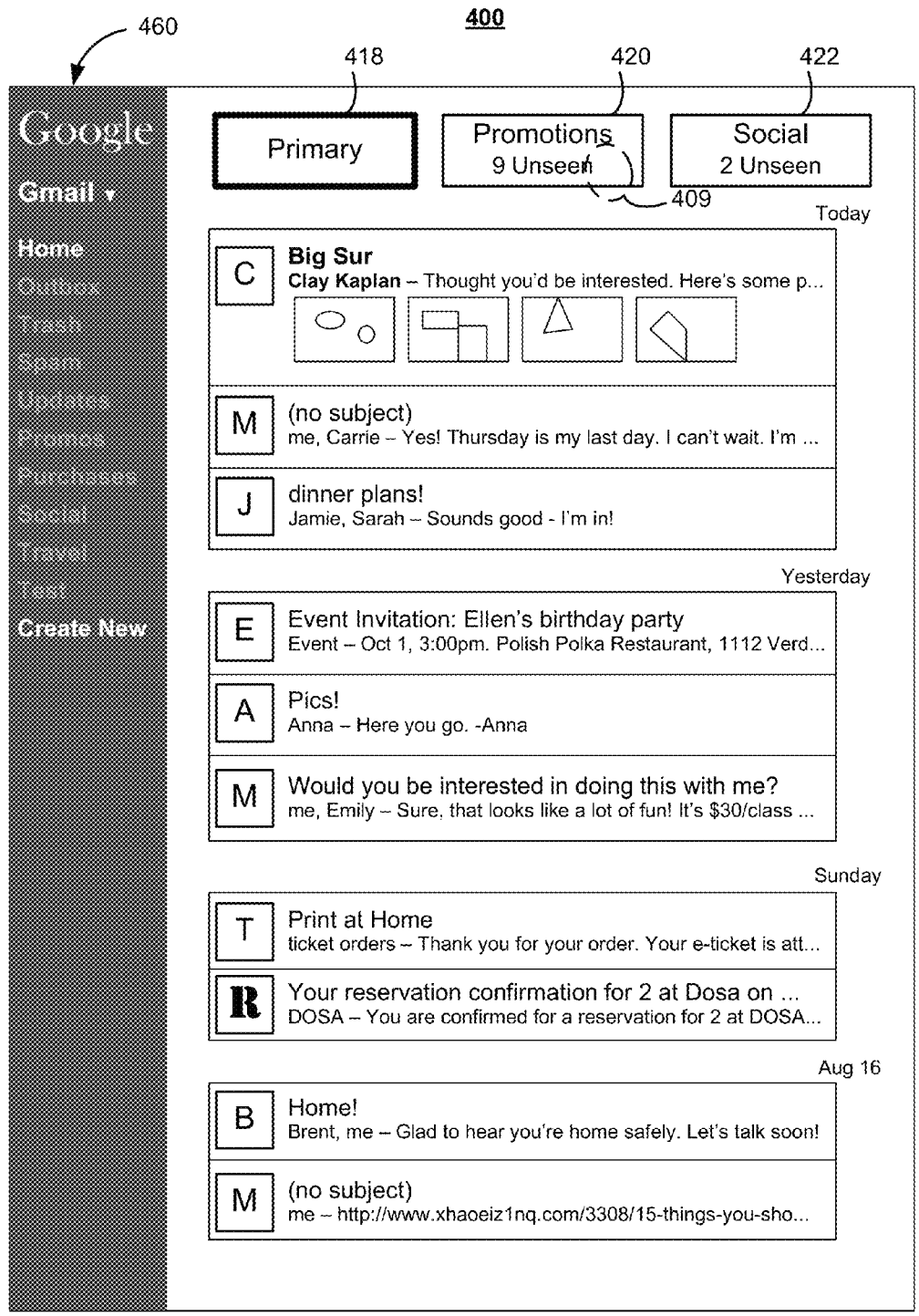
Figure 4E:
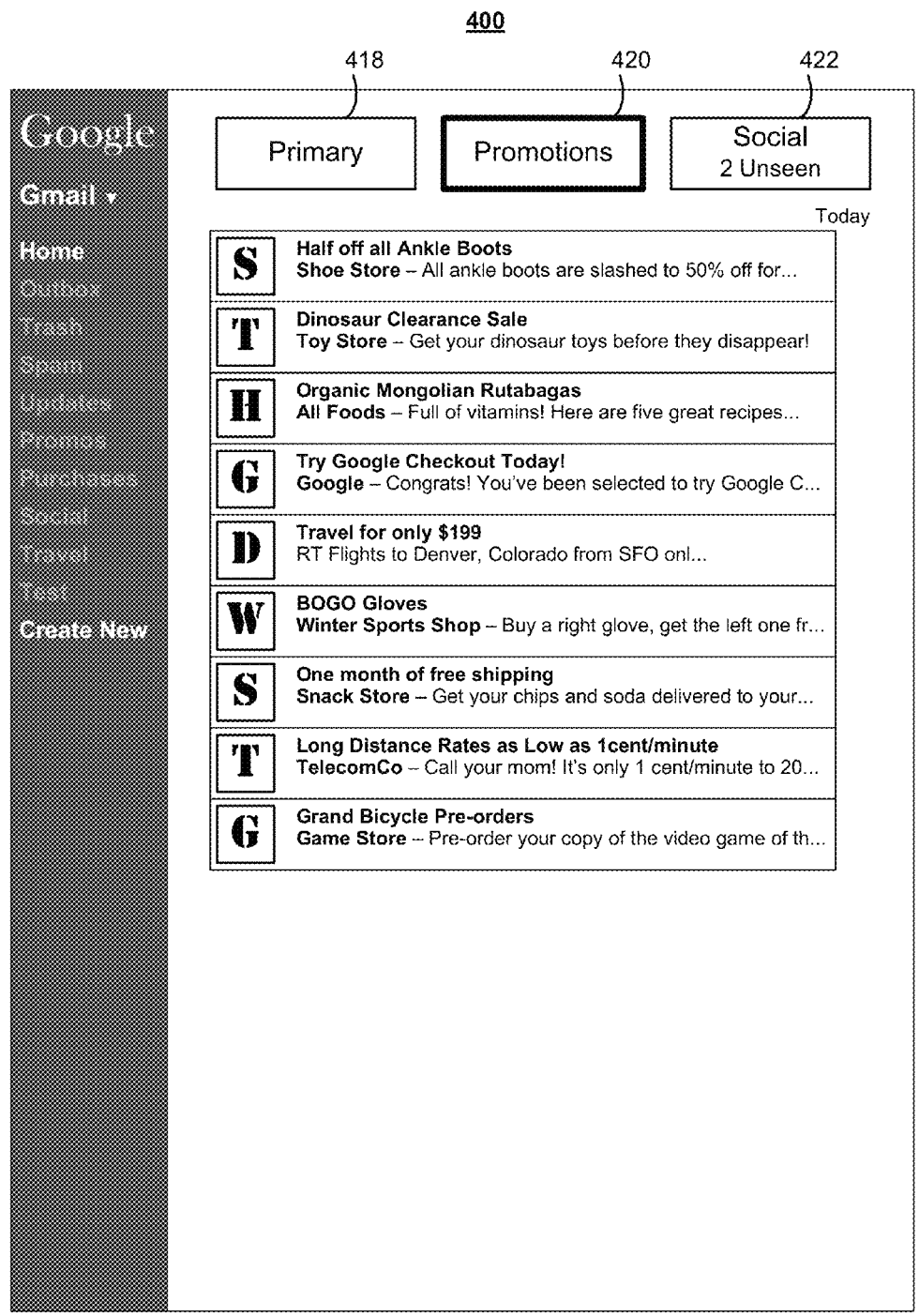

FIGS. 4D-4E illustrate example user interfaces with one or more tabs in accordance with some embodiments.

In FIG. 4D, the user interface 400 includes one or more tabs, such as a first tab 418 for displaying a first message cluster (e.g., electronic messages that are deemed to be primary electronic messages), a second tab 420 for displaying a second message cluster (e.g., electronic messages that are deemed to be promotional messages), and a third tab 422 for displaying a third message cluster (e.g., electronic messages that are deemed to be posts on social networks). In some embodiments, a tab is displayed with an indication of a number of messages that have a predefined display status, in the group of electronic messages corresponding to the tab. For example, the second tab 420 in FIG. 4D is displayed with an indication of a number of electronic messages that have not been previously displayed (e.g., "9 Unseen") in the message cluster corresponding to the second tab 420 (e.g., promotional messages), and the third tab 422 is displayed with an indication of a number of electronic messages that have not been previously displayed (e.g., "2 Unseen") in the message cluster corresponding to the third tab 422 (e.g., social updates).

Advantageously, referring to FIG. 4D, in the systems and methods of the present disclosure, a user is able to select a subset of message clusters in a plurality of message clusters that will be used. For example, referring to FIG. 4D, each of the titles listed under "Gmail" in column 460" represent a respective message cluster in a plurality of message clusters. Each of these message clusters is uniquely associated with a corresponding set of clustering rules in a plurality of sets of clustering rules (not shown). In some embodiments the message cluster "Primary" is a default message cluster that is always present. In FIG. 4D, the user has selected the additional message clusters Promotions 420 and Social 422. Promotions 420 and Social 422 each represent a message cluster 120 and one or more electronic messages are associated with each of the message clusters. The user can select additional message clusters, remove message clusters, or define new message clusters. Once the user has selected the desired subset of message clusters, each respective electronic message in a first plurality of electronic messages, where each respective electronic message in the first plurality of electronic messages is addressed to the first user or is from the first user, is assigned to one or more of the message clusters in the subset of message clusters that the user has selected in accordance with the sets of clustering rules, in the plurality of sets of clustering rules, associated with the subset of messaging clusters that the user has selected. The message clustering rules have some selectivity. For instance, the set of clustering rules for at least one message cluster in the subset of message clusters that the user has selected acts to prevent some electronic messages in the first plurality of electronic messages from being assigned to the first message cluster. Moreover, the set of clustering rules for at least one message cluster in the subset of message clusters that the user has selected assigns electronic messages to the first message cluster without regard to content relatedness between electronic messages in the first plurality of electronic messages and electronic messages already in the first message cluster.

FIG. 4D also illustrates detection of a user input 409 (e.g., a touch input, a mouse click, etc.) on the example user interface 400. In FIG. 4D, the user input 409 is detected on the second tab 420, corresponding to a user selection of the second tab 420.

FIG. 4E illustrates that, in response to detecting user selection of the second tab 420, electronic messages in the message cluster corresponding to the second tab 420 are displayed. In some embodiments, such display includes concurrent display of all electronic messages associated with the message cluster represented by the second tab. For example, in FIG. 4E, all nine of the electronic messages associated with the "Promotions" message cluster that corresponds to the second tab 420 are displayed in response to detecting user selection of the second tab 420. In some embodiments, only a subset of the messages in the message cluster associated with the second tab is displayed in response to detecting user selection of the second tab 420. For example, in some embodiments, when display of all of the electronic messages associated with the message cluster that corresponds to a tab exceeds a display size of a user interface, only a subset of electronic messages in the corresponding message cluster is displayed.

In some embodiments, all of the electronic messages listed in the example user interface 400 are deemed to be displayed, regardless of whether only a subset of a text of each electronic message is displayed.

Although the one or more indicia shown in FIGS. 4A-4E are illustrated to be included in corresponding user interface objects, a person having ordinary skill in the art would understand that the one or more indicia need not be included in corresponding user interface objects. For example, in some embodiments, the indication of "9 Unseen" for the user interface object 402-1 partially overlaps the user interface object 402-1. In some embodiments, the indication of "9 Unseen" for the user interface object 402-1 is displayed separated from the user interface object 402-1. In some embodiments, the indication of a number of messages that have a predefined display status includes one or more numbers without any text (e.g., a number "9" in a colored circle).

Figure 5B:
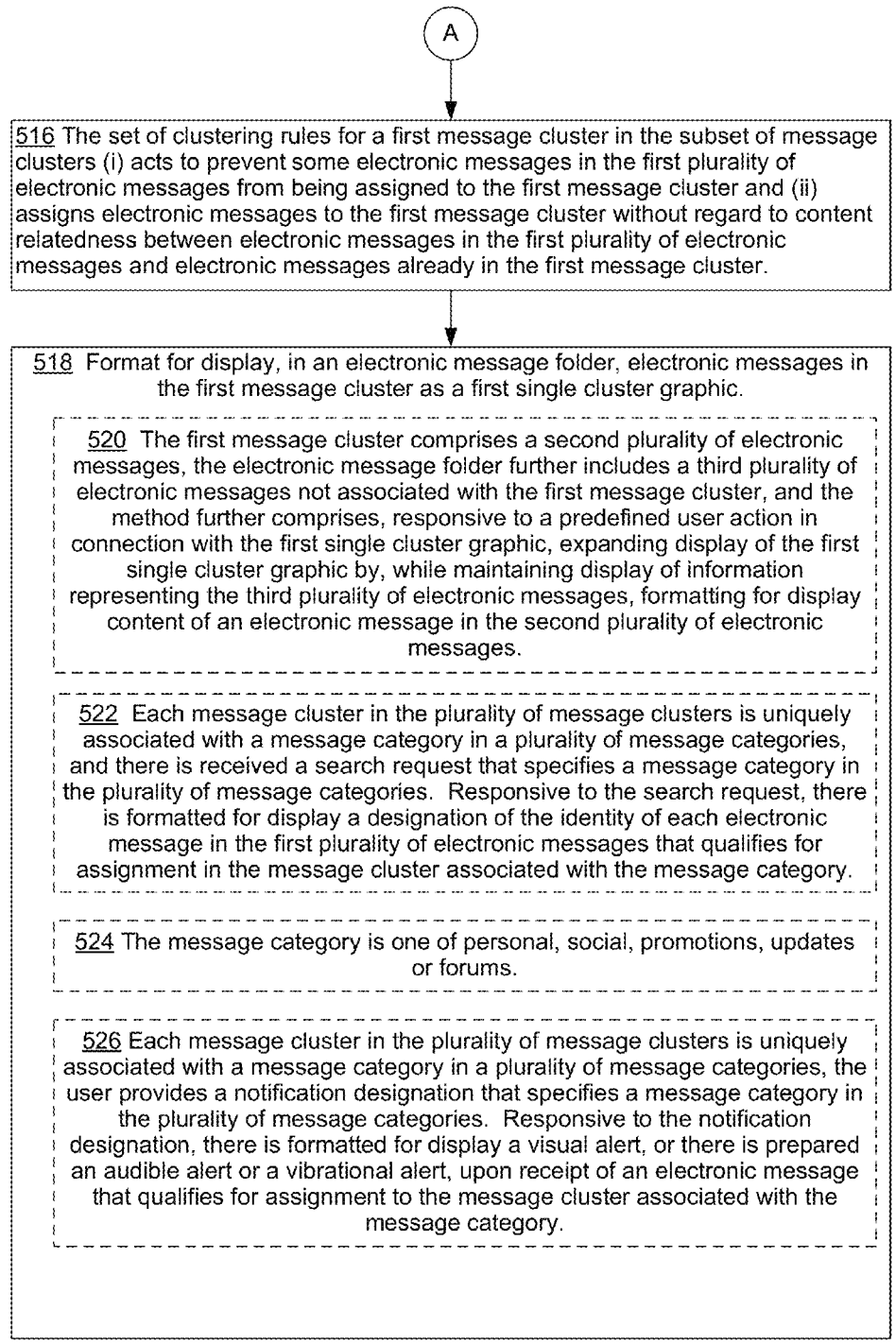

FIGS. 4A-4E are used to describe operations illustrated in FIGS. 5A and 5B.

FIGS. 5A and 5B are example flow charts illustrating a method 500 in accordance with some embodiments. In some embodiments, the method 500 is performed at a computing device (e.g., device 106, FIG. 2) having one or more processors and memory storing one or more programs for execution by the one or more processors. In some embodiments, the computing device includes a display. In some embodiments, the computing device is coupled with a display, but does not include the display as part of the computing device.

The method includes (502) receiving a selection, by a first user, of a subset of message clusters in a plurality of message clusters, where each respective message cluster in the plurality of message clusters is uniquely associated with a corresponding set of clustering rules in a plurality of sets of clustering rules. For example, in FIG. 4D, the plurality of message clusters includes "Trash," "Spam," social updates "Updates," "Promos"/"Promotions," "Purchases," "Social," "Travel," and "Test." A user selects the "Promotions" message cluster and the "Social" message cluster.

The method continues (504) with each respective electronic message in a first plurality of electronic messages, where each respective electronic message in the first plurality of electronic messages is addressed to the first user or is from the first user, being assigned to one or more of the message clusters in the subset of message clusters in accordance with the sets of clustering rules, in the plurality of sets of clustering rules, associated with the subset of messaging clusters. For instance, referring to FIG. 4D, if the user has requested only the "promotions" and "social" message category, then the plurality of messages associated with a user are assigned based on the set of clustering rules for the "primary" message cluster, the set of clustering rules for the "promotions" message cluster, and the set of clustering rules for the "social" message cluster. In some embodiments, a single electronic message may be assigned to more than one of the message clusters in the subset of message clusters. In some embodiments, a single electronic message may be forced to be assigned to only one of the subset of message clusters.

In some embodiments (506) the plurality of message clusters comprises one or more system message clusters and the corresponding sets of clustering rules for the one or more system message clusters are applied on a system-wide basis across a plurality of users including the first user. For example, in FIG. 4D, each of the message clusters "Trash," "Spam," social updates "Updates," "Promos"/"Promotions," "Purchases," "Social," "Travel," and "Test" as well as "Primary" are each system message clusters and the corresponding sets of clustering rules for the one or more system message clusters are applied on a system-wide basis across a plurality of users including the first user. Thus, in such embodiments, the set of clustering rules that determine which of a user's electronic messages will be associated with their "Updates" message cluster is the same for all users of computing system 100. In some embodiments (508) the one or more system message clusters includes a message cluster for personal electronic messages, a message cluster for social electronic messages, a message cluster for electronic messages pertaining to promotions, a message cluster for electronic messages pertaining to updates, or a message cluster for electronic messages pertaining to forums.

In some embodiments (510) a user is able to customize a system message cluster. For example, in some embodiments, a first clustering rule for a first system cluster in the one or more system message clusters is received from the first user. Thereafter, electronic messages in the first plurality of electronic messages are assigned to the first system cluster that both (i) satisfy the first clustering rule and (ii) satisfy the set of clustering rules for the first system cluster. For example, consider the case in which the system message cluster is "Promotions" and the first user no longer wishes to get messages from a particular retailer. The user may add a rule that bars electronic messages originating from the particular retailer into the "Promotions" system message cluster. Thus, only electronic messages that both (i) satisfy the first clustering rule (the electronic message cannot be from the banned retailer) and (ii) satisfy the set of clustering rules for the "Promotions" system message cluster are associated with the first user's "Promotions" system message cluster.

In some embodiments (512), the plurality of message clusters comprises one or more user defined message clusters and the corresponding set of clustering rules for the one or more user defined message clusters are uniquely applied to electronic messages addressed to the first user, or authored by the first user, in order to determine which electronic messages are to be assigned to the one or more user defined message clusters. For instance, referring to FIG. 4D, a user can select "Create New" from column 460 and create an entirely new message cluster.

Advantageously, in some embodiments (514), a user can evaluate a message cluster prior to selecting the message cluster for inclusion in the subset of message clusters that will be used to organize the user's electronic messages. For example, in some embodiments, a preview request associated with a message cluster in the plurality of message clusters is received. Responsive to the preview request, there is formatted for display a designation of the identity of one or more senders of electronic messages in the first plurality of electronic messages that qualify for inclusion in the message cluster in accordance with the set of clustering rules associated with the second message cluster. Thus, referring to FIG. 4D, the first user is able to preview the Promotions system message cluster 420 by, for example, obtaining a listing of an identity of the senders that have sent electronic messages to the first user that qualify for inclusion in the Promotions system message cluster. In this way, the first user is able determine whether they want to select the Promotions system message cluster for use.

Each respective set of clustering rules selects a subset of electronic messages from among the electronic messages that are addressed to a given user for association with the message cluster corresponding to the respective set of clustering rules. As such, each set of clustering rules is selective. For example, in some embodiments 516, the set of clustering rules for a first message cluster in the subset of message clusters selected by a user (i) acts to prevent some electronic messages in the first plurality of electronic messages (that are addressed to and/or are from the first user) from being assigned to the first message cluster (associated with the set of clustering rules) and (ii) assigns electronic messages to the first message cluster without regard to content relatedness between electronic messages in the first plurality of electronic messages and electronic messages already in the first message cluster. This independence of the content relatedness between electronic messages in the first plurality of electronic messages and electronic messages already in the first message cluster is described in U.S. patent application Ser. No. 14/139,205, filed Dec. 23, 2013, entitled "Systems and Methods for Clustering Electronic Messages," which is hereby incorporated by reference herein in its entirety. Whereas conversations aggregate electronic messages based on content relatedness (e.g., header content relatedness) between messages already in the conversations and messages being considered for assignment to conversations, electronic messages are organized into message clusters without regard to content relatedness between messages within the message clusters and messages being considered for assignment to the message clusters in accordance with the associated set of clustering rules for the message cluster. For example, a string of messages from and to a first and second user or group of users are good candidates for inclusion in a conversation because of the content relatedness between the messages in the conversations and the messages being considered for the conversations. However, absent some additional criterion or factor, the relatedness in the source and destination of these messages does not serve as a basis for inclusion in the same message cluster.

In the disclosed methods (518), electronic messages for a first message cluster (one of the message clusters selected by the user) are formatted for display as a first single cluster graphic in an electronic message folder. For example, turning to FIGS. 1 and 4A, in some embodiments, analysis module 170, operating on user interface cluster displaying system 106, will package the electronic messages associated with a message cluster selected by the first user in accordance with the set of clustering rules associated with the message cluster. In one example, the message cluster is "Promotions" and analysis module packages the electronic messages associated with this message cluster into a first single graphic such as graphic 120-1 of FIG. 4C, which is expandable to the graphic illustrated in FIG. 4B. In some embodiments (520), the first message cluster comprises a second plurality of electronic messages, for example the nine unseen messages in the Promotions message cluster 120-1 of FIG. 4. The electronic message folder further includes a third plurality of electronic messages not associated with the first message cluster, for example the messages listed under Yesterday, Sunday and August 16 in FIG. 4A. In such embodiments, the method further comprises, responsive to a predefined user action in connection with the first single cluster graphic (for example touch 405 as described above), expanding display of the first single cluster graphic by, while maintaining display of information representing the third plurality of electronic messages, formatting for display content of an electronic message in the second plurality of electronic messages. For example, turning to FIG. 4B, there is formatted for display content of the electronic messages in the second plurality of electronic messages (the nine unseen messages 416 of the "Promotions" message cluster 120-1.

In some embodiments (522), each message cluster in the plurality of message clusters is uniquely associated with a message category in a plurality of message categories. This gives rise to an advantageous embodiment in which a user can search by category. For instance, in some embodiments, a search request is received that specifies a message category in the plurality of message categories. Responsive to the search request, there is formatted for display a designation of the identity of each electronic message in the first plurality of electronic messages that qualifies for assignment in the message cluster associated with the message category. For instance, to obtain the messages 416 in the promotions 120 category, the user could simply search by category (e.g., the promotions category) rather than attempt to construct a search expression that will retrieve these messages. In some embodiments (524), the message category is one of personal, social, promotions, updates or forums.

In some embodiments (526), each message cluster in the plurality of message clusters is uniquely associated with a message category in a plurality of message categories, and the method further comprises receiving a notification designation that specifies a message category in the plurality of message categories. Responsive to the notification designation, there is formatted for display a visual alert, or there is prepared an audible alert or a vibrational alert, upon receipt of an electronic message that qualifies for assignment to the message cluster associated with the message category. Thus, for example, referring to FIG. 4A, a user can specify that each time a new electronic message is assigned to the users "Promotions" message cluster, an audible alarm will sound, a vibrational alert will be made, or a visual alert will be presented. In some embodiments, each respective message cluster gets assigned a unique notification signal, such as a unique visual alert, a unique audible alert, or a unique vibrational alert each time a an electronic message is assigned to the respective message cluster. In some embodiments, the notification is conditional upon a device associated with the first user so that the notification is suppressed when the first user is using a device in a first device class and the notification is made when the first user is using a device in a second device class. In some embodiments, the first device class is one of desktop or mobile and the second device class is other than the first device class and is one of desktop or mobile.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment (s). In general, structures and functionality presented as separate components in the example configurations may be implemented as a combined structure or component. Similarly, structures and functionality presented as a single component may be implemented as separate components. These and other variations, modifications, additions, and improvements fall within the scope of the embodiment(s).

It will also be understood that, although the terms "first," "second," etc. may be used herein to describe various elements, these elements should not be limited by these terms. These terms are only used to distinguish one element from another. For example, a first user interface object could be termed a second user interface object, and, similarly, a second user interface object could be termed a first user interface object, without changing the meaning of the description, so long as all occurrences of the "first user interface object" are renamed consistently and all occurrences of the "second user interface object" are renamed consistently. The first user interface object and the second user interface object are both user interface objects, but they are not the same user interface object.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative embodiments. For purposes of explanation, numerous specific details were set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
   at a computing device having one or more processors and memory storing one or more programs for execution by the one or more processors:
   displaying a message list in an electronic message folder, wherein:
     the message list includes a plurality of individual electronic messages and a plurality of message clusters;
     each message cluster is displayed as a respective single cluster graphic;
     each message cluster is uniquely associated with a corresponding set of clustering rules;
     a first message cluster of the plurality of message clusters contains a plurality of electronic messages; and
     display of each item in the message list includes a respective single enlarged alphabetic character, which corresponds to an initial character of a sender name when the item is an individual electronic message and corresponds to an initial character of a cluster name when the item is a message cluster,
   receiving user specification of a supplemental clustering rule for the first message cluster, wherein the supplemental clustering rule is based on content of electronic messages;
   while defining the supplemental clustering rule, and prior to saving the supplemental clustering rule:

displaying a designation identifying one or more senders of electronic messages in a sample plurality of electronic messages that qualify for inclusion in the first message cluster in accordance with the supplemental rule and the set of clustering rules associated with the first message cluster and in accordance with a display state of the first message cluster in which a subset of the text for each respective electronic message in the sample plurality of electronic messages is displayed;

saving the supplemental clustering rule;

applying the supplemental clustering rule and the sets of clustering rules associated with the plurality of message cluster to the plurality of individual electronic message, thereby assigning a first electronic message of the plurality of individual messages to the first message cluster;

redisplaying the message list, including ceasing to display the first electronic message as an individual electronic message in the message list and updating display of the single cluster graphic for the first message clusters to indicate inclusion of the first electronic message.

2. The method of claim 1, wherein
the first message cluster comprises a second plurality of electronic messages,
the electronic message folder further includes a third plurality of electronic messages not associated with the first message cluster,
the method further comprising:
responsive to a predefined user action in connection with the single cluster graphic:
expanding display of the single cluster graphic by:
while maintaining display of information representing the third plurality of electronic messages, formatting for display content of an electronic message in the second plurality of electronic messages.

3. The method of claim 1, wherein the plurality of message clusters comprises one or more system message clusters and wherein the corresponding sets of clustering rules for the one or more system message clusters are applied on a system-wide basis across a plurality of users including the first user.

4. The method of claim 3, wherein the one or more system message clusters includes a message cluster selected from the group consisting of a message cluster for personal electronic messages, a message cluster for social electronic messages, a message cluster for electronic messages pertaining to promotions, a message cluster for electronic messages pertaining to updates, and a message cluster for electronic messages pertaining to forums.

5. The method of claim 1, wherein the plurality of message clusters comprises one or more user defined message clusters and wherein the corresponding sets of clustering rules for the one or more user defined message clusters are uniquely applied to electronic messages addressed to the first user, or authored by the first user, in order to determine which electronic messages are to be assigned to the one or more user defined message clusters.

6. The method of claim 1, wherein each message cluster in the plurality of message clusters is uniquely associated with a message category in a plurality of message categories, the method further comprising:
receiving a search request that specifies a message category in the plurality of message categories; and
responsive to the search request, formatting for display a designation of the identity of each electronic message in the first plurality of electronic messages that qualifies for assignment in the message cluster associated with the message category.

7. The method of claim 6, wherein the message category is one of personal, social, promotions, updates or forums.

8. The method of claim 1, wherein each message cluster in the plurality of message clusters is uniquely associated with a message category in a plurality of message categories, the method further comprising:
receiving a notification designation that specifies a message category in the plurality of message categories; and
responsive to the notification designation, formatting for display a visual alert, or preparing an audible alert or a vibrational alert, upon receipt of an electronic message that qualifies for assignment to the message cluster associated with the message category.

9. The method of claim 8, wherein the message category is one of personal, social, promotions, updates or forums.

10. The method of claim 8, wherein the notification is conditional upon a device associated with the first user so that the notification is suppressed when the first user is using a device in a first device class and the notification is made when the first user is using a device in a second device class.

11. The method of claim 10, wherein the first device class is one of desktop or mobile and the second device class is other than the first device class and is one of desktop or mobile.

12. A computing device, comprising:
one or more processors;
memory; and
one or more programs, wherein the one or more programs are stored in the memory and are configured to be executed by the one or more processors, the one or more programs including instructions for:
displaying a message list in an electronic message folder, wherein:
the message list includes a plurality of individual electronic messages and a plurality of message clusters,
each message cluster is displayed as a respective single cluster graphic;
each message cluster is uniquely associated with a corresponding set of clustering rules;
a first message cluster of the plurality of message clusters contains a plurality of electronic messages; and
display of each item in the message list includes a respective single enlarged alphabetic character, which corresponds to an initial character of a sender name when the item is an individual electronic message and corresponds to an initial character of a cluster name when the item is a message cluster;
receiving user specification of a supplemental clustering rule for the first message cluster, wherein the supplemental clustering rule is based on content of electronic messages;
while defining the supplemental clustering rule, and prior to saving the supplemental clustering rule:
displaying a designation identifying one or more senders of electronic messages in a sample plurality of electronic messages that qualify for inclusion in the first message cluster in accordance with the supplemental rule and the set of clustering rules associated with the first message cluster;
saving the supplemental clustering rule;

applying the supplemental clustering rule and the sets of clustering rules associated with the plurality of message clusters to the plurality of individual electronic messages, thereby assigning a first electronic message of the plurality of individual messages to the first message cluster;

redisplaying the message list, including ceasing to display the first electronic message as an individual electronic message in the message list and updating display of the single cluster graphic for the first message cluster to indicate inclusion of the first electronic message.

13. The computing device of claim 12, wherein the plurality of message clusters comprises one or more system message clusters and wherein the corresponding set of clustering rules for the one or more system message clusters are applied on a system-wide basis across a plurality of users including the first user.

14. The computing device of claim 13, wherein the one or more system message clusters includes a message cluster selected from the group consisting of a message cluster for personal electronic messages, a message cluster for social electronic messages, a message cluster for electronic messages pertaining to promotions, a message cluster for electronic messages pertaining to updates, and a message cluster for electronic messages pertaining to forums.

* * * * *

UNITED STATES PATENT AND TRADEMARK OFFICE
CERTIFICATE OF CORRECTION

PATENT NO. : 9,542,668 B2
APPLICATION NO. : 14/186823
DATED : January 10, 2017
INVENTOR(S) : Gilad et al.

It is certified that error appears in the above-identified patent and that said Letters Patent is hereby corrected as shown below:

In the Claims

Claim 1, Column 21, Line 14, please delete "cluster to the plurality of individual electronic message," and insert --clusters to the plurality of individual electronic messages,--;

Claim 1, Column 21, Line 21, please delete "message clusters to" and insert --message cluster to--.

Signed and Sealed this
Twenty-eighth Day of March, 2017

Michelle K. Lee
*Director of the United States Patent and Trademark Office*